(12) United States Patent
Gobart

(10) Patent No.: US 9,889,782 B2
(45) Date of Patent: Feb. 13, 2018

(54) TRUCK BED ASSIST HANDLE

(71) Applicant: GM GLOBAL TECHNOLOGY OPERATIONS LLC, Detroit, MI (US)

(72) Inventor: James G. Gobart, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/145,923

(22) Filed: May 4, 2016

(65) Prior Publication Data

US 2017/0320419 A1 Nov. 9, 2017

(51) Int. Cl.
*B60R 3/02* (2006.01)
*B62D 33/03* (2006.01)
*B60N 3/02* (2006.01)

(52) U.S. Cl.
CPC . *B60N 3/02* (2013.01); *B60R 3/02* (2013.01)

(58) Field of Classification Search
CPC .................................. B60N 3/02; B60R 3/02
USPC ....................................................... 296/1.02
See application file for complete search history.

(56) References Cited

U.S. PATENT DOCUMENTS

| 5,046,582 | A | 9/1991 | Albrecht |
| 6,974,134 | B1 | 12/2005 | Macri et al. |
| 7,249,395 | B2 | 7/2007 | Brammer, Jr. et al. |
| 7,347,473 | B2 | 3/2008 | Miller et al. |
| 8,251,423 | B1 * | 8/2012 | Lingle ...................... B60R 3/00 296/1.02 |
| 8,613,475 | B1 | 12/2013 | Statz |
| 8,678,457 | B1 * | 3/2014 | Duderstadt ............... B60R 3/00 16/429 |

* cited by examiner

*Primary Examiner* — Joseph D Pape
*Assistant Examiner* — Dana Ivey
(74) *Attorney, Agent, or Firm* — Quinn IP Law

(57) ABSTRACT

An assist handle assembly includes a bracket, and a handle. The bracket includes a tubular portion concentric with and extending along a vertical axis. The handle includes a vertical portion and a horizontal portion. The vertical portion is partially disposed within and supported by the tubular portion, and is concentric with and extends along the vertical axis. The horizontal portion extends from an upper end of the vertical portion in a direction that is transverse to the vertical axis. The handle is rotatable about the vertical axis between a stowed position and an intermediate position, and is slideable axially along the vertical axis within the tubular portion of the bracket, between the intermediate position and a deployed position. A latching mechanism secures the handle relative to the bracket when in the deployed position.

18 Claims, 4 Drawing Sheets

TRUCK BED ASSIST HANDLE

TECHNICAL FIELD

The disclosure generally relates to an assist handle for a vehicle.

BACKGROUND

Vehicles, such as but not limited to pick-up trucks, may include a body structure, such as a bed of a pick-up truck, that defines a cargo area. The body includes lateral sidewalls that bound the cargo area, and an opening between the sidewalls allowing access to the cargo area. Such vehicles may be equipped with a step assist handle that a user may grasp while stepping into or out of the cargo area of the vehicle to help steady themselves.

SUMMARY

An assist handle assembly for a vehicle is provided. The assist handle assembly includes a bracket, and a handle. The bracket is configured for attachment to a sidewall of a vehicular body, and includes a tubular portion concentric with and extending along a vertical axis. The handle includes a vertical portion and a horizontal portion. The vertical portion of the handle is partially disposed within and supported by the tubular portion of the bracket, and is concentric with and extends along the vertical axis between a lower end and an upper end. The horizontal portion extends from the upper end of the vertical portion in a direction that is transverse to the vertical axis. The handle is rotatable about the vertical axis between a stowed position and an intermediate position, and is slideable axially along the vertical axis within the tubular portion of the bracket, between the intermediate position and a deployed position.

A vehicle is also provided. The vehicle includes a body having a sidewall, and an assist handle assembly attached to the body. The assist handle assembly includes a bracket and a handle. The bracket includes a tubular portion that is concentric with and extends along a vertical axis. The handle includes a vertical portion and a horizontal portion. The vertical portion of the handle is partially disposed within and supported by the tubular portion of the bracket, and is concentric with and extends along the vertical axis, between a lower end and an upper end. The horizontal portion extends from the upper end of the vertical portion in a direction that is transverse to the vertical axis. The handle is rotatable relative to the bracket about the vertical axis, between a stowed position and an intermediate position. The handle is slideable within the tubular portion of the bracket between the intermediate position and a deployed position. A latching mechanism interconnects the bracket and the handle. The latching mechanism is operable to secure the handle relative to the bracket when the handle is disposed in the deployed position.

Accordingly, the assist handle assembly may be stowed adjacent the sidewall of the body when not needed for ingress and egress into and/or out of a cargo area of the body. When needed, the handle is rotated about the vertical axis of the tubular portion, thereby moving the horizontal portion on a horizontal plane between the stowed position and the intermediate position, to position the horizontal portion of the handle rearward of the opening. The handle is then slideably moved vertically upward into the deployed position to raise the horizontal portion to a higher elevation relative to the body. These movements are reversed to move the handle from the deployed position into the stowed position. The assist handle assembly is a convenient, simple, and economical device that improves access to a cargo area of a vehicle.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
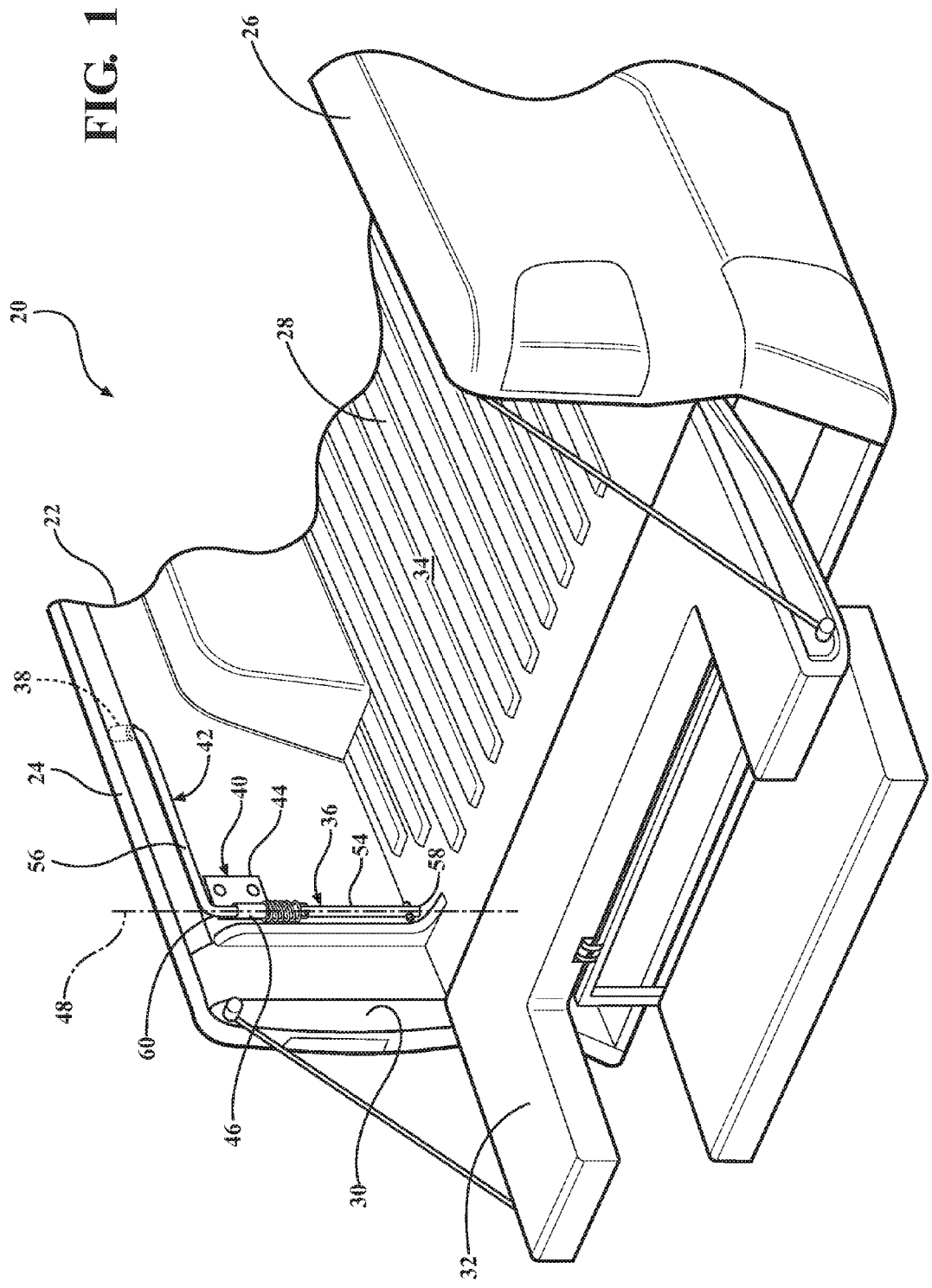
FIG. 1 is a schematic perspective view of a vehicle showing an assist handle assembly in a stowed position.
Figure 2:
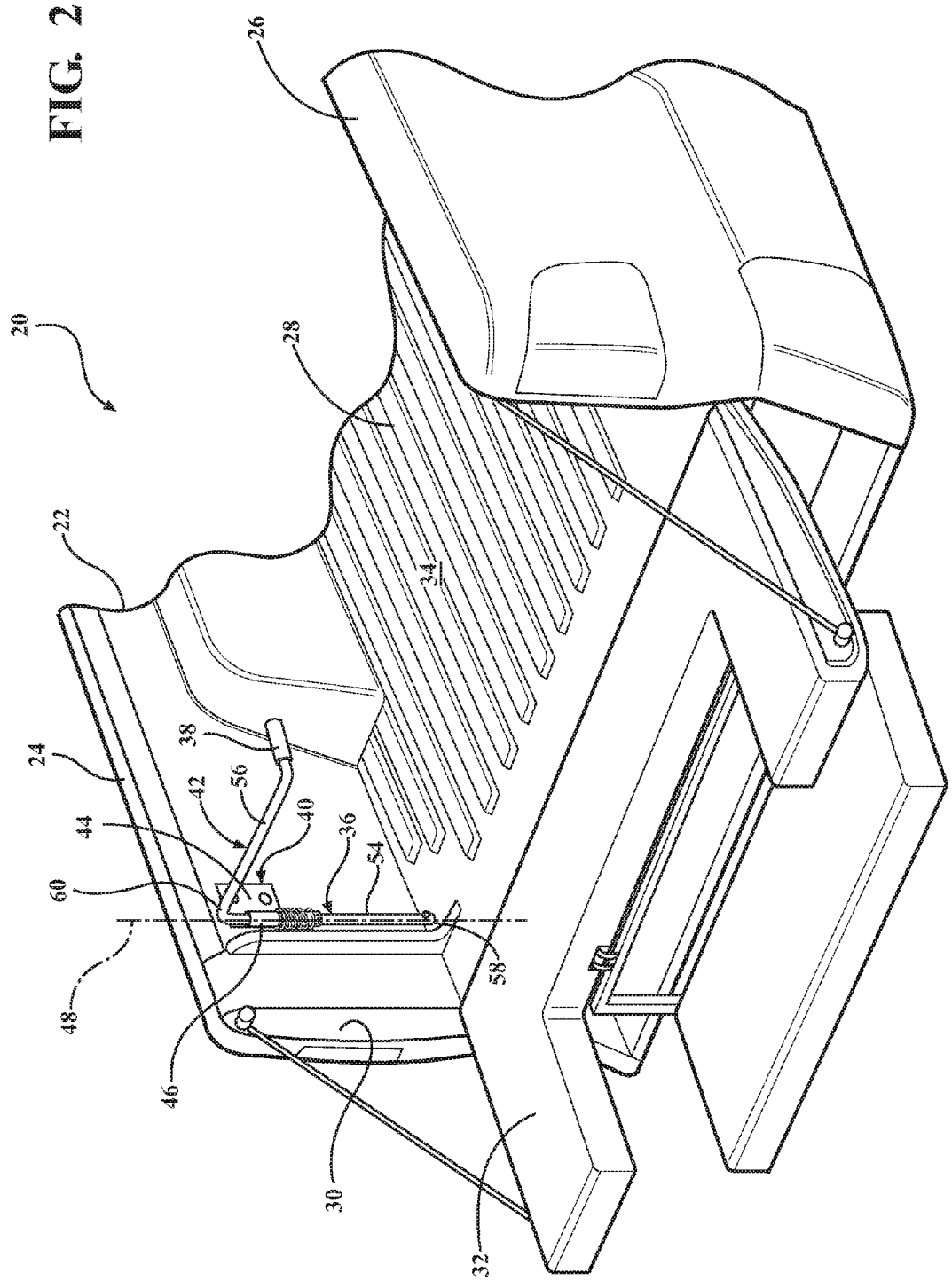
FIG. 2 is a schematic perspective view of the vehicle showing the assist handle assembly in an intermediate position.
Figure 3:
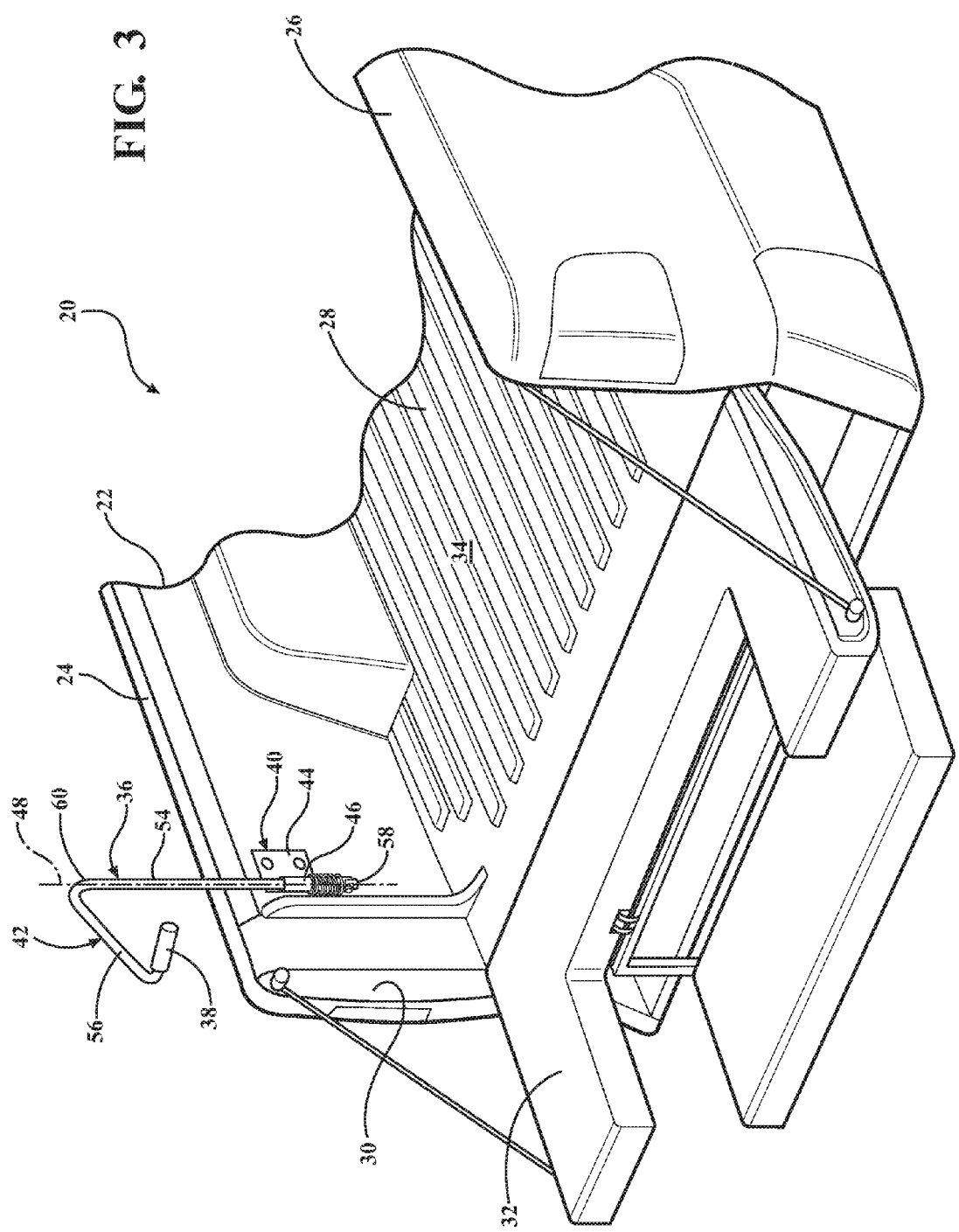
FIG. 3 is a schematic perspective view of the vehicle showing the assist handle assembly in a deployed position.

Referring to the Figures, wherein like numerals indicate like parts throughout the several views, a vehicle is generally shown at 20. Referring to FIGS. 1-3, the vehicle 20 includes a body 22. An exemplary embodiment of the body 22 is shown in the Figures and described herein as a bed for a pick-up truck. However, it should be appreciated that the body 22 may be configured in some other manner, for some other type of vehicle 20, such as but not limited to a body 22 for a box truck or cargo trailer.

As shown in the exemplary embodiment, the body 22 includes a first sidewall 24, a second sidewall 26, a floor 28, and an opening 30 disposed at a longitudinal rearward end of the floor 28, between the first sidewall 24 and the second sidewall 26. The first sidewall 24, the second sidewall 26, and the floor 28 cooperate to define a cargo area 34 therebetween. As shown, the first sidewall 24 is shown in a left side of the body 22, and the second sidewall 26 is shown on a right side of the body 22. However, it should be appreciated that the relative positions of the first sidewall 24 and the second sidewall 26 may be reversed, such that the first sidewall 24 is disposed on the right side of the body 22, and the second sidewall 26 is disposed on the left side of the body 22. The opening 30 in the body 22 at the rearward end of the floor 28 allows access to the cargo area 34. As shown in the exemplary embodiment, the body 22 further includes a tailgate 32. The tailgate 32 is rotatably attached to the body 22, adjacent the rearward end of the floor 28. The tailgate 32 is rotatable between a closed position for closing the opening 30 in the body 22, and an open position allowing access through the opening 30 in the body 22. Operators wishing to gain access to the cargo area 34, through the opening 30 in the body 22, often step onto the tailgate 32. Accordingly, the tailgate 32 may include a step to make ingress and egress into and out of the cargo area 34 easier to the operator.

The vehicle 20 further includes an assist handle assembly 36. The assist handle assembly 36 is attached to the body 22, and is moveable between a stowed position, shown in FIG. 1, and a deployed position, shown in FIG. 3. When positioned in the deployed position, the assist handle 42 presents a grip 38 over the tailgate 32 to provide the operator a hand hold to further assist ingress and egress into and out of the cargo area 34. When not needed to assist in ingress and egress into and out of the cargo area 34, the assist handle assembly 36 may be positioned in the stowed position, so as to not interfere or otherwise block the opening 30.

The assist handle assembly 36 includes a bracket 40 and a handle 42. The bracket 40 is attached to a sidewall of the body 22. As shown, the bracket 40 is attached to the first sidewall 24. However, it should be appreciated that the bracket 40 may alternatively be attached to the second sidewall 26. The bracket 40 includes a planar portion 44 and a tubular portion 46. The planar portion 44 of the bracket 40 is configured for attachment to the first sidewall 24, and supports the tubular portion 46 relative to the body 22. The planar portion 44 may be configured in any manner suitable to enable attachment to the first sidewall 24. For example and as shown in the exemplary embodiment, the planar portion 44 includes a pair of apertures, through which fasteners pass through and into threaded engagement with the first sidewall 24 of the body 22.

In the exemplary embodiment shown in the Figures and described herein, the tubular portion 46 is concentric with and extends along an axis. As shown in the Figures and described herein, the axis of the tubular portion 46 extends in a vertical direction, and is therefore hereinafter referred to as the vertical axis. However, it should be appreciated that other embodiments may be configured such that the axis of the tubular portion 46 is not necessarily vertical. Accordingly, the scope of the claims should not be limited to require that the axis of the tubular portion 46 is vertical.

The tubular portion 46 includes an exterior wall 50 that defines a hollow center 52. As used herein, the term "tubular" is defined as an object having the shape of a hollow body. Accordingly, the term tubular may include wither a cylindrical tubular body or non-cylindrical tubular body, such as a square tubular body. Accordingly, the exterior wall 50 may define a cross section perpendicular to the vertical axis 48 that is circular or non-circular, such as a square.

The handle 42 includes a first portion and a second portion. The first portion is hereinafter referred to as the vertical portion 54, and the second portion is hereinafter referred to as the horizontal portion 56. It should be appreciated that the terms "vertical" and "horizontal" are used generally as descriptors to differentiate the different portions of the handle 42, and are not intended to be limiting. The vertical portion 54 of the handle 42 is partially disposed within and supported by the tubular portion 46 of the bracket 40, within the hollow center 52 of the tubular portion 46. Accordingly, the vertical portion 54 is at least partially surrounded by the exterior wall 50 of the tubular portion 46. The vertical portion 54 of the handle 42 is concentric with and extends along the vertical axis, between a lower end 58 and an upper end 60. The horizontal portion 56 of the handle 42 extends from the upper end 60 of the vertical portion 54, in a direction that is transverse to the vertical axis 48. In the exemplary embodiment shown in the Figures and described herein, the vertical portion 54 of the handle 42 lies on a vertical plane relative to the body 22, and the horizontal portion 56 is perpendicular to the vertical portion 54, and lies on a horizontal plane relative to the body 22. The vertical axis 48 is disposed on the vertical plane, and the horizontal axis is perpendicular to and intersects the vertical axis 48. The horizontal portion 56 of the handle 42 includes the grip 38, which is laterally offset from the vertical axis 48. The grip 38 may be angled relative to the horizontal portion 56, such as shown in the Figures of the exemplary embodiment. Alternatively, the grip 38 may simply be an extension of the horizontal portion 56 of the handle 42.

As shown in the exemplary embodiment, the vertical portion 54 of the handle 42 includes an annular cross sectional shape perpendicular to the vertical axis 48. However, it should be appreciated that the vertical portion 54 may include a non-annular cross sectional shape perpendicular to the vertical axis 48, and be fitted with a bushing that facilitates rotation of the vertical portion 54 relative to the tubular portion 46 of the bracket 40.

The handle 42 is rotatable about the vertical axis 48 between the stowed position, shown in FIG. 1, and an intermediate position, shown in FIG. 2. The handle 42 is rotatable about the vertical axis 48 to rotate the horizontal portion 56 of the handle 42 on a horizontal plane relative to the body 22, to present the grip 38 over the tailgate 32 when the tailgate 32 is disposed in the open position. The handle 42 is slideable axially along the vertical axis 48, within the tubular portion 46 of the bracket 40, between the intermediate position, shown in FIG. 2, and the deployed position, shown in FIG. 3. The handle 42 is axially slideable along vertical axis 48 relative to the tubular portion 46 of the bracket 40 to change an elevation of the grip 38 relative to the body 22, and to position the grip 38 as a hand hold to assist in ingress and egress into and out of the bed.

Figure 4:
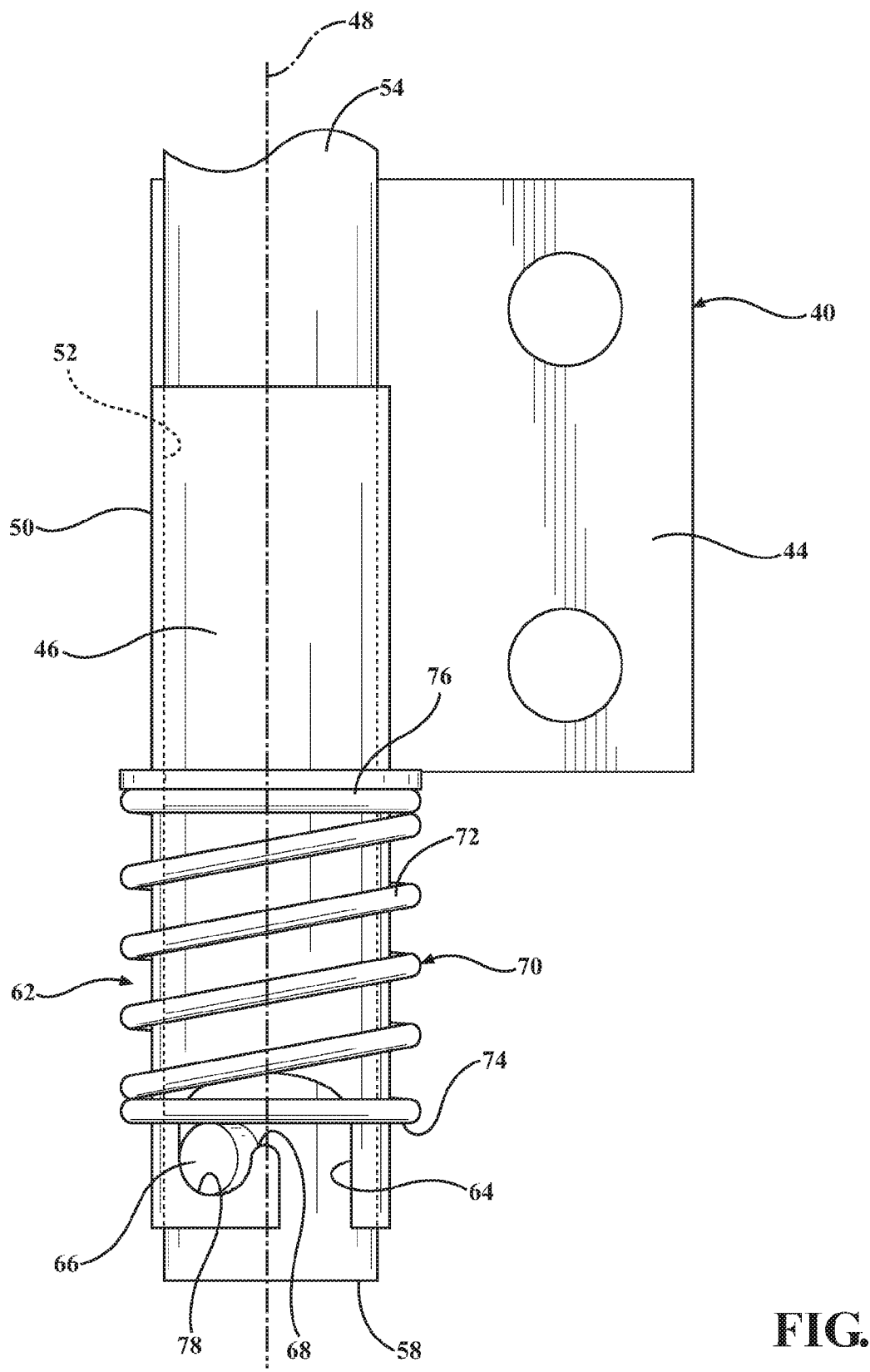
FIG. 4 is a schematic side view of a latching mechanism of the assist handle assembly showing a handle of the assist handle assembly secured relative to a bracket of the assist handle assembly.

Referring to FIG. 4, the assist handle assembly 36 further includes a latching mechanism 62. The latching mechanism 62 is operable to secure the handle 42 relative to the bracket 40 when the handle 42 is disposed in the deployed position. The latching mechanism 62 may be configured in any suitable manner capable of securing the handle 42 relative to the bracket 40 in the deployed position. For example, in the exemplary embodiment shown in the Figures and described herein, the latching mechanism 62 includes a cam slot 64 defined by the tubular portion 46 of the bracket 40, and a post 66 attached to the vertical portion 54 of the handle 42. The post 66 extends away from the vertical portion 54 of the handle 42 in a direction that is transverse to the vertical axis. The post 66 is disposed adjacent the lower end 58 of the vertical portion 54 of the handle 42.

The post 66 engages the cam slot 64 in interlocking engagement when the handle 42 is disposed in the deployed position. The cam slot 64 defines a profile 68 that secures the handle 42 against rotation about the vertical axis 48 relative to the bracket 40, and also supports the handle 42 against axial movement along the vertical axis 48 relative to the bracket 40.

The exemplary embodiment of the latching mechanism 62 includes a biasing device 70 that is operable to bias the post 66 into the interlocking engagement with the cam slot 64. The biasing device 70 may include but is not limited to a coil spring 72 that is disposed about an exterior of the tubular portion 46. The coil spring 72 includes a first end 74 that is secured relative to the tubular portion 46 to bias against the bracket 40, and a second end 76 that engages the post 66 to bias axially the post 66 axially along the vertical axis 48. While the biasing device 70 has been described as including the coil spring 72, it should be appreciated that the biasing device 70 may include some other device capable of biasing the post 66 into interlocking engagement with the cam slot 64. Furthermore, while the latching mechanism 62 has been described herein as including the post 66, the cam slot 64, and the biasing device 70, it should be appreciated that the latching mechanism 62 may be configured in some other manner, and include different components than are shown and described herein.

Referring to FIG. 1, when positioned in the stowed position, the vertical portion 54 of the handle 42 is lowered in the tubular portion 46 of the bracket 40 along the vertical axis 48 to a lowermost position. When the vertical portion 54 of the handle 42 is lowered to the lowermost position, the horizontal portion 56 of the handle 42 lies on a first or lower horizontal plane. When positioned in the stowed position, the horizontal portion 56 of the handle 42 structure is rotated about the vertical axis 48 on the lower horizontal plane so that the horizontal portion 56 extends generally parallel with a longitudinal axis of the body 22, and is disposed against the first sidewall 24 of the body 22.

Moving the handle 42 from the stowed position, shown in FIG. 1, into the deployed position, shown in FIG. 3, requires first moving the handle 42 from the stowed position into the intermediate position, shown in FIG. 2, with a first movement. The handle 42 is then moved from the intermediate position into the deployed position, shown in FIG. 3, with a second movement. In order to move the handle 42 from the stowed position into the intermediate position, the handle 42 is rotated about the vertical axis 48 on the lower horizontal plane, toward a rear of the body 22, until the horizontal portion 56 is positioned over the tailgate 32. The handle 42 structure is then moved into the deployed position, whereupon the post 66 engages the cam slot 64 and the biasing device 70 secures the handle 42 in the deployed position relative to the bracket 40, in order to provide a secure hand-hold for the user to grasp. In order to move the handle 42 structure from the intermediate position into the deployed position, the handle 42 structure is lifted or raised vertically along the vertical axis, relative to the bracket 40, until the post 66 at the lower end 58 of the vertical portion 54 of the handle 42 engages the cam slot 64 in the tubular portion 46 of the bracket 40. When the handle 42 structure is raised from the intermediate position into the deployed position, the horizontal portion 56 of the handle 42 structure moves from the lower horizontal plane to a second, higher horizontal plane. Accordingly, movement of the handle 42 structure from the stowed position into the deployed position requires raising the horizontal portion 56 of the handle 42 structure from the lower horizontal plane into the higher horizontal plane.

In the exemplary embodiment of the latching mechanism 62 shown in the Figures and described herein, once the handle 42 is raised to the second, higher horizontal plane, the post 66 enters the cam slot 64. Referring to FIG. 4, in order for the post 66 to engage the cam slot 64 in interlocking engagement, the handle 42 must be further rotated about the vertical axis 48, to position the post 66 within a notch section 78 in the profile 68 of the cam slot 64. The biasing device 70 biases the post 66 downward into the notch section 78, with the notch section 78 restricting rotation of the handle 42 about the vertical axis 48. In order to move the handle 42 structure from the deployed position back into the stowed position, the process described above is reversed. In order for the post 66 to disengage the cam slot 64, the biasing device 70 must be compressed and the handle 42 raised so that the post 66 may clear the notch section 78, thereby allowing the handle 42 to be slightly rotated so that the post 66 may disengage the cam slot 64. Once the post 66 is disengaged from the cam slot 64, the handle 42 may be lowered axially along the vertical axis 48 into the intermediate position, and then rotated bout the vertical axis 48 into the stowed position.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An assist handle assembly for a vehicle, the assist handle assembly comprising:
   a bracket configured for attachment to a sidewall of a vehicular body, and including a tubular portion concentric with and extending along a vertical axis;
   a handle having a vertical portion and a horizontal portion, wherein the vertical portion of the handle has a lower end and an upper end and extends along the vertical axis and is partially disposed within and supported by the tubular portion of the bracket, and wherein the horizontal portion extends from the upper end of the vertical portion in a direction that is transverse to the vertical axis;
   wherein the handle is rotatable about the vertical axis between a stowed position and an intermediate position;
   wherein the handle is slideable axially along the vertical axis within the tubular portion of the bracket between the intermediate position and a deployed position; and
   a latching mechanism operable to secure the handle relative to the bracket when the handle is disposed in the deployed position.

2. The assist handle assembly set forth in claim 1 wherein the latching mechanism includes a cam slot defined by the tubular portion of the bracket.

3. The assist handle assembly set forth in claim 2 wherein the latching mechanism includes a post attached to the vertical portion of the handle and extending away from the vertical portion in a direction that is transverse to the vertical axis.

4. The assist handle assembly set forth in claim 3 wherein the post is disposed adjacent the lower end of the vertical portion of the handle.

5. The assist handle assembly set forth in claim 3 wherein the post engages the cam slot in interlocking engagement when the handle is disposed in the deployed position.

6. The assist handle assembly set forth in claim 5 wherein the cam slot defines a profile that secures the handle against rotation about the vertical axis relative to the bracket, and supports the handle against axial movement along the vertical axis relative to the bracket.

7. The assist handle assembly set forth in claim 5 wherein the latching mechanism includes a biasing device operable to bias the post into the interlocking engagement with the cam slot.

8. The assist handle assembly set forth in claim 7 wherein the biasing device includes a coil spring disposed about the tubular portion, wherein the coil spring includes a first end secured relative to the tubular portion to bias against the bracket, and a second end to bias axially along the vertical axis against the post.

9. The assist handle assembly set forth in claim 1 wherein the tubular portion includes an exterior wall defining a hollow, cylindrical center, with the vertical portion of the handle disposed within the cylindrical center and surrounded by the exterior wall.

10. The assist handle assembly set forth in claim 9 wherein the vertical portion of the handle includes an annular cross sectional shape perpendicular to the vertical axis.

11. The assist handle assembly set forth in claim 1 wherein the horizontal portion of the handle includes a grip that is laterally offset from the vertical axis.

12. A vehicle comprising:
a body including a sidewall;
an assist handle assembly attached to the body, the assist handle assembly including:
a bracket attached to the sidewall of the body, wherein the bracket includes a tubular portion concentric with and extending along a vertical axis;
a handle having a vertical portion and a horizontal portion, wherein the vertical portion of the handle has a lower end and an upper end and extends along the vertical axis and is partially disposed within and supported by the tubular portion of the bracket, and wherein the horizontal portion extends from the upper end of the vertical portion in a direction that is transverse to the vertical axis;
wherein the handle is rotatable relative to the bracket about the vertical axis between a stowed position and an intermediate position;
wherein the handle is slideable within the tubular portion of the bracket between the intermediate position and a deployed position; and
a latching mechanism interconnecting the bracket and the handle, and operable to secure the handle relative to the bracket when the handle is disposed in the deployed position.

13. The vehicle set forth in claim 12 wherein the latching mechanism includes a cam slot defined by the tubular portion of the bracket, and a post attached to the vertical portion of the handle and extending away from the vertical portion in a direction that is transverse to the vertical axis, wherein the post engages the cam slot in interlocking engagement when the handle is disposed in the deployed position.

14. The vehicle set forth in claim 13 wherein the cam slot defines a profile that secures the handle against rotation about the vertical axis relative to the bracket, and supports the handle against axial movement along the vertical axis relative to the bracket.

15. The vehicle set forth in claim 13 wherein the post is disposed adjacent the lower end of the vertical portion of the handle.

16. The vehicle set forth in claim 13 wherein the latching mechanism includes a biasing device operable to bias the post into the interlocking engagement with the cam slot.

17. The vehicle set forth in claim 16 wherein the biasing device includes a coil spring disposed about the tubular portion, wherein the coil spring includes a first end secured relative to the tubular portion to bias against the bracket, and a second end to bias axially along the vertical axis against the post.

18. A bed for a pick-up truck, the bed comprising:
a body defining a first sidewall, a second sidewall, a floor, and an opening disposed at a longitudinal rearward end of the floor, between the first sidewall and the second sidewall;
a tailgate rotatably attached to the body, adjacent the longitudinal rearward end of the floor, and rotatable between a closed position for closing the opening in the body, and an open position allowing access through the opening in the body; and
an assist handle assembly attached to the body, the assist handle assembly including:
a bracket attached to the first sidewall adjacent the opening in the body, and including a tubular portion concentric with and extending along a vertical axis;
a handle having a vertical portion and a horizontal portion, wherein the vertical portion of the handle has a lower end and an upper end and extends along the vertical axis and is partially disposed within and supported by the tubular portion of the bracket, and
wherein the horizontal portion extends from the upper end of the vertical portion in a direction that is transverse to the vertical axis, to present a grip at a distal end of the horizontal portion that is laterally spaced from the vertical axis;
wherein the handle is rotatable about the vertical axis, between a stowed position and an intermediate position, to rotate the horizontal portion of the handle on a horizontal plane relative to the body, to present the grip over the tailgate when the tailgate is disposed in the open position;
wherein the handle is axially slideable along a vertical axis within the tubular portion of the bracket, between the intermediate position and a deployed position, to change an elevation of the grip relative to the body to position the grip as a hand hold to assist in ingress and egress into and out of the bed;
a cam slot defined by the tubular portion of the bracket
a post attached to the vertical portion of the handle adjacent the lower end of the vertical portion, and extending away from the vertical portion in a direction that is transverse to the vertical axis;
wherein the post engages the cam slot in interlocking engagement when the handle is disposed in the deployed position;
wherein the cam slot defines a profile that secures the handle against rotation about the vertical axis relative to the bracket, and supports the handle against axial movement along the vertical axis relative to the bracket, when the post is engaged with the cam slot; and
a coil spring disposed about the tubular portion of the bracket, and including a first end secured relative to the tubular portion to bias against the bracket, and a second end to bias axially along the vertical axis against the post.

* * * * *